United States Patent [19]

Jacob

[11] Patent Number: 4,621,329
[45] Date of Patent: Nov. 4, 1986

[54] STAR CATALOG NAVIGATION SYSTEM
[75] Inventor: James J. Jacob, Atherton, Calif.
[73] Assignee: Itek Corporation, Beverly Hills, Calif.
[21] Appl. No.: 108,862
[22] Filed: Dec. 31, 1979
[51] Int. Cl.[4] ............................................. G06F 15/50
[52] U.S. Cl. ..................................... 364/455; 356/141
[58] Field of Search .................. 364/443, 455; 33/268; 358/103; 350/358; 356/141, 152

[56]     References Cited
U.S. PATENT DOCUMENTS

| 3,571,567 | 3/1971 | Eckermann et al. | 364/455 |
| 3,636,330 | 1/1972 | Holeman et al. | 364/455 |
| 4,052,121 | 10/1977 | Chang | 350/358 |
| 4,181,851 | 1/1980 | Allen et al. | 356/141 |

Primary Examiner—Gary Chin
Attorney, Agent, or Firm—Roy L. Brown; Homer O. Blair; Robert L. Nathans

[57]     ABSTRACT

A star pattern within the field of view is transmitted through a non-collinear acousto optic filter and is focused upon the input screen of a vidicon, which in turn is coupled to input storage devices of a computer, each device being associated with a particular frequency band within the spectrum of light being examined. The contents of the input storage devices are compared with binary data within a star catalog which contains geometric reference patterns of stars and their frequency signatures. When a correlation signal is produced by the comparator, an output signal indicating the position of the pattern in the sky may be produced by a dictionary which could form part of the computer or be remotely located with respect to the computer.

12 Claims, 4 Drawing Figures

STAR CATALOG NAVIGATION SYSTEM

TECHNICAL FIELD

This invention relates to the field of computer controlled navigation systems for space vehicles or the like.

BACKGROUND OF THE INVENTION

Since ancient times, man has been navigating by identifying the position of various patterns of celestial bodies such as planets and stars, in the sky. In more recent times, computer controlled navigation systems have been developed to automatically control the direction of various vehicles such as space craft. The digital computer contains a star catalog which comprises a large body of digital data which represents various patterns of celestial bodies. Viewing optics focuses a given pattern of celestial bodies within its field of view upon a light sensitive array such as a vidicon tube, which in turn transmits digital data to storage devices within the computer which data is representative of the pattern of the celestial bodies being viewed. This pattern is compared with numerous patterns digitally stored within the computer and the computer is able to determine the orientation of the space craft. In accordance with these prior art systems, a plurality of such patterns must be generally matched by the computer before the final position may be determined, since there are numerous similar patterns of celestial bodies in the sky. It is an object of the present invention to reduce the time required to compute the position of the space craft. It is a further object of the invention to reduce the data base representing many patterns of celestial bodies in the computer.

DISCLOSURE OF THE INVENTION

In accordance with the preferred embodiment of the present invention, a tunable acousto optic filter is positioned between the optical elements examining the field of view and the input of a two-dimensional light detection array such as a vidicon tube. The filter possesses a relatively large angular viewing aperture with high resolving power and high optical transmission of the star patterns being viewed so that images of the celestial bodies may pass through the tunable acousto optic filter (TAOF) and be imaged on the face of the vidicon tube. The TAOF has a narrow spectral band pass which may be tuned or swept rapidly over a large portion of the frequency spectrum of light simply by changing the frequency of electrical signals applied thereto. This process is controlled by the computer so that a geometric image of celestial bodies is inputted into the computer along with the spectral frequency signature of each celestial body making up the pattern, and as a result, the entire system is able to compute the orientation of the space craft in a shorter period of time and with a smaller data base than prior art systems.

DETAILED DESCRIPTION

Figure 1:
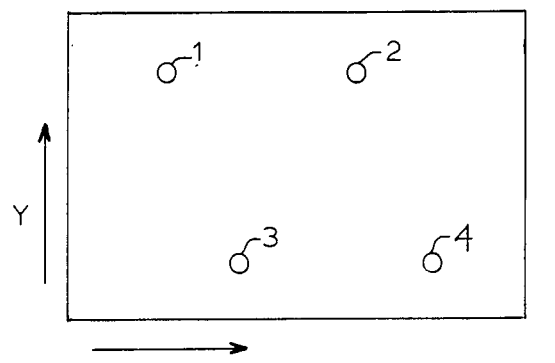
FIG. 1 illustrates an exemplary pattern of four stars within the field of view.

In FIG. 1, celestial bodies such as stars or planets, 1, 2, 3, and 4, could for example, assume a pattern having a parallelogram shape, such pattern being in the field of view.

The term TAOF as used in this patent is intended to cover tunable acousto optic filters and their equivalents set forth in U.S. Pat. No. 4,052,121 to I. Cheng Chang, and in a paper entitled "Tunable Acousto Optic Filters: An Overview", by I. C. Chang, SPIE, Volume 90, Acousto-Optics (1976), incorporated herein by reference.

Figure 2:
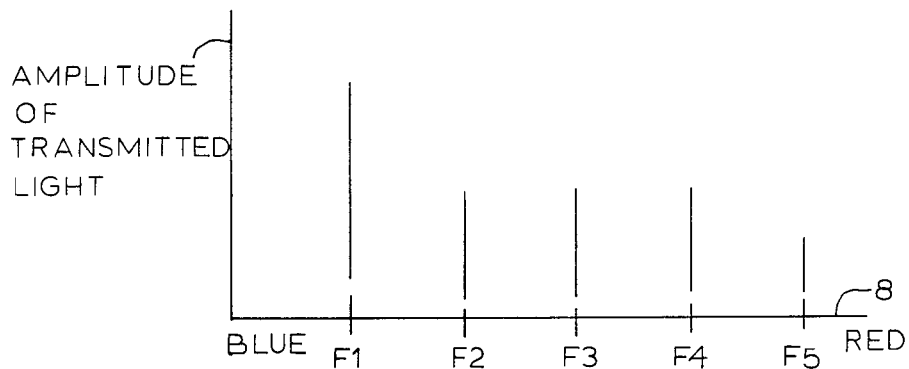
FIG. 2 illustrates an exemplary frequency signature of light emitted by a particular star.

Each star emits a unique signature of wave length of light having various intensities in each frequency band, which signature will be used in conjunction with the shape of the geometric star pattern within the field of view to provide an improved star catalog navigation system in accordance with the teachings of the invention. For example, let it be assumed that stars 1 and 4 in the field of view have a frequency signature represented by the vertical lines in FIG. 2. In this example the amplitude or intensity of the light emitted by the stars in the blue band is quite high, whereas the amplitude of light in the red band is small and less than the intermediate amplitudes in bands labelled F2, F3, and F4 in the figure. On the other hand, stars 2 and 3 could have a diametrically opposite frequency signature so that, for example, the vertical line in the red F5 band could be quite high, as the intensity of red light is greatest and the intensity of blue light emitted is very small.

Figure 4:
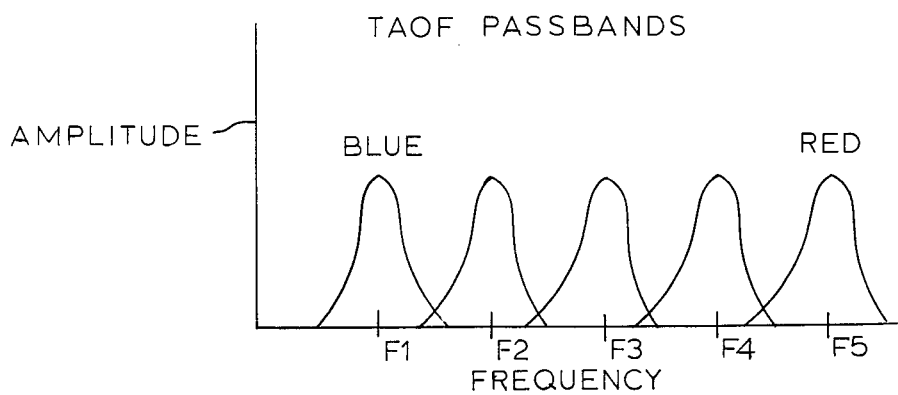
FIG. 4 illustrates a band pass diagram.
Figure 3:
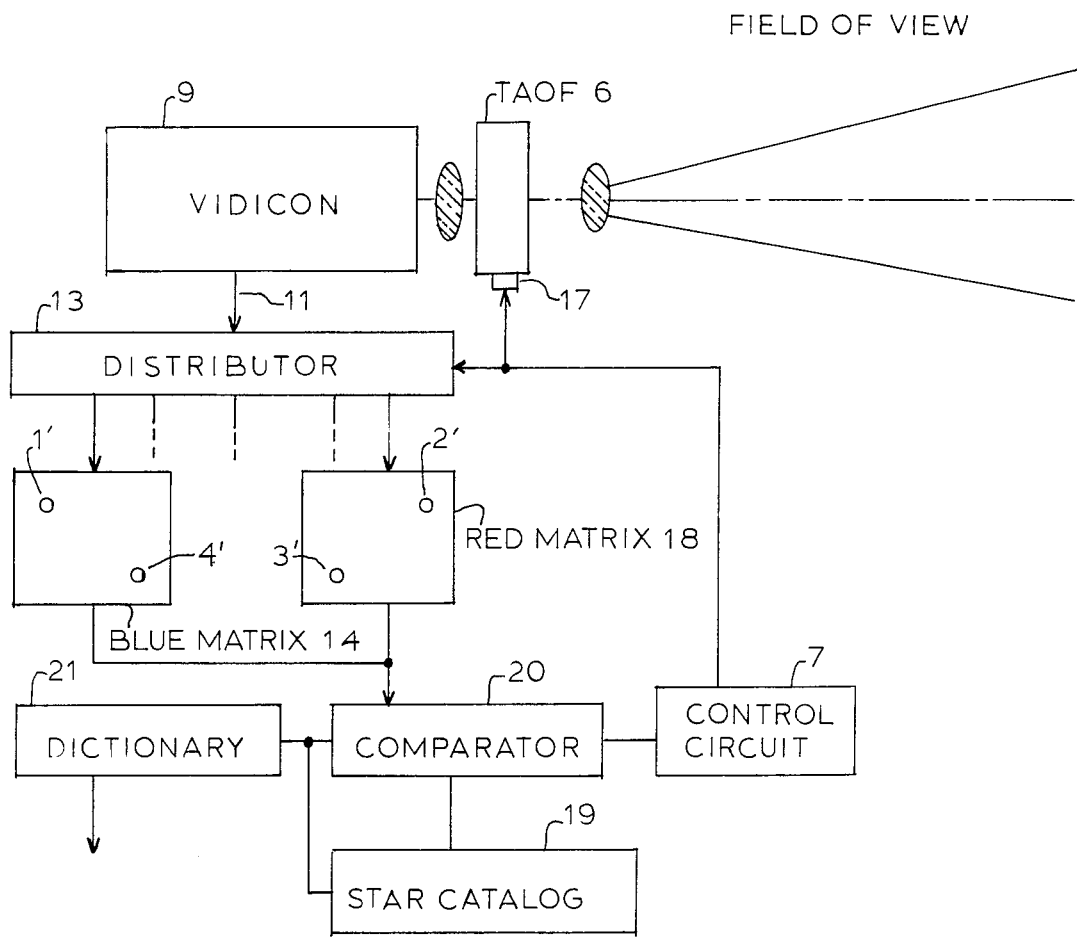
FIG. 3 schematically illustrates an embodiment of the present invention.

Now let it be assumed that a signal of a suitable frequency is supplied to TAOF 6 via control circuit 7. This signal will continually change in frequency so that the narrow band pass "window" of the TAOF 6 will change, thereby to scan in the frequency domain along the horizontal axis of FIG. 2. The pass band of the TAOF can be tailored to simulate the color filters presently used to spectrally catalog the stars. Thus, the TAOF pass band is stepped from one color band to the next until enough frequency bands are integrated for correlation with a give star catalog. (See FIG. 4.) Vidicon tube 9 has its output lead 11 coupled to the color matrices of the computer via distributor 13, which in turn could be controlled by the sweep signal produced by drive circuit 7.

Now let it be assumed that TAOF 6 is passing light within the blue F1 band pass at the beginning of the frequency spectrum scanning process, and also let it be assumed that only stars 1 and 4 are emitting significant quantities of blue light. The XY scanning of the vidicon will be correlated with the XY scanning of the input circuitry of a first blue matrix 14. Stars 1 and 4 but not 2 and 3, will produce illuminated spots on the photosensitive surface of the vidicon, and binary light intensity data will be inserted into blue matrix 14 at XY positions corresponding to the XY positions of stars 1 and 4, and the intensity of blue light indicated by the strength of the vidicon output pulses. On the other hand, assuming, for the purpose of describing the invention, stars 2 and 3 do not emit significant quantities of blue light, no data entries relating to stars 2 and 3 will be made in the blue matrix 14. This is schematically illustrated by marking the blue matrix with dots 1' and 4' which correspond to stars 1 and 4, but not marking matrix 14 with points corresponding to the XY coordinates of stars 2 and 3. It may now be seen that data has been inserted into the blue computer input address matrix representing the XY position of stars 1 and 4 which emit significant amounts of blue light, together with binary data indicative of the relative intensities of the blue light. Control circuit 7 thereafter applies a different frequency signal to electro-acoustic transducer 17 of TAOF 6, to cause the narrow band pass window to shift to examine the F2 color band illustrated in FIG. 2. Additionally, distributor 13 is actuated to couple the F2 frequency band matrix (not shown) to the output circuitry of the vidicon tube and the above process is repeated.

Finally, the TAOF 6 will be tuned to pass light in the red frequency band F5 and red matrix 18 is now coupled to output circuit 11 of vidicon 9.

Now let it be assumed that stars 2 and 3 emit bright light in the red color band in contrast with stars 1 and 4. The process described above in connection with blue matrix 14 is repeated and the significant radiation of red light by stars 2 and 3 is schematically represented by dots 2' and 3' within red matrix 18, the position of which corresponds to the XY position of stars 2 and 3 in FIG. 1. Thus, the five color matrices will contain digital information representing the XY position of each star of the viewed pattern and the relative amplitudes or intensities of the emitted light within each frequency band, i.e., the frequency signature.

The computer now sequentially compares the now stored geometric pattern and frequency signatures of stars in the field of view with digital data within its star catalog memory 19, and when the proper match of geometric patterns and frequency signatures occurs, as indicated by comparator 20, dictionary 21 will produce output data indicative of the location in the heavens of the particular star pattern within the field of view. Since numerous computer programs and configurations well within the ordinary skill of the workers in the art may be utilized to perform the above described functions, details have been omitted in the interest of clarity and brevity.

In summary, the present invention, by inputting both the color signature and the geometric pattern of stars (the term "stars" also includes planets, galaxies, etc.) into the computer, greatly reduces the size of the data bank otherwise required. Where geometric patterns alone are being compared, adjacent patterns with respect to the pattern in the field of view are generally viewed to eliminate ambiguity. For example, a plurality of specially shaped triangles of stars may be present in different portions of the heavens. Rather than storing thousands of geometric patterns within the data bank to eliminate the ambiguity, it is believed that, due to the dual use of the color signatures of the stars together with the geometric patterns, that only one hundred or so of the brightest star patterns need be employed to indicate the position of the spacecraft. As a result, the computation time will additionally be sharply reduced.

It should be understood that other components and configurations may be substituted for those described in order to practice the invention, and the invention is to be limited only by the permissable scope of the following claims. References are made in the claims to numbered components in the described embodiments, and it should be understood that the claims are not to be restricted to such embodiments, as the numbers employed in the claims are merely exemplary of the nature of the claimed means.

What is claimed:

1. A star catalog navigation system comprising:
   a. optical image detection means (9);
   b. an electrically tunable light filter (6) having a variable frequency band pass characteristic;
   c. control means (7) for enabling said filter to transmit light within selected frequency bands of the light spectrum to said optical image detection means;
   d. optical means for transmitting the light image of a star pattern within the field of view of said optical means through said filter and upon said optical image detection means;
   e. comparator address means (13, 14, 18) for receiving data indicative of the geometrical shape of said pattern, together with the frequency signature of the stars within said pattern;
   f. star catalog means (19) for storing data indicative of reference star patterns, together with the frequency signature of the stars comprising said reference patterns; and
   g. comparator means (20) for comparing the signals received by said comparator address means with the contents of said star catalog means until a correlation signal is produced.

2. The combination as set forth in claim 1 further including dictionary means (21) responsive to said correlation signal for producing an indication of the position of the said star pattern.

3. The cmbination as set forth in claim 1 wherein said comparator address means comprises a plurality of matrix means, each associated with a particular frequency band of light.

4. The combination as set forth in claim 2 wherein said comparator address means comprises a plurality of matrix means, each associated with a particular frequency band of light.

5. The combination as set forth in claims 1, 2, 3 or 4 wherein said filter is of the non-collinear acousto-optic type.

6. A star catalog navigation system comprising:
   a. a two-dimensional array of light detectors;
   b. an electrically tunable light filter having a variable frequency band pass characteristic;
   c. control means for enabling said filter to transmit light within selected frequency bands of the light spectrum to said array of light detectors;
   d. optical means for transmitting the light image of a star pattern within the field of view of said optical means through said filter and focusing said image upon said two-dimensional array of light detectors;
   e. comparator address means for receiving data indicative of the geometrical shape of said star pattern together with the frequency signature of the stars comprising said star pattern;
   f. star catalog means for storing data indicative of reference star patterns together with the frequency signature of the stars comprising said star patterns; and
   g. comparator means for comparing the signals received by said comparator address means with the contents of said star catalog means until a correlation signal is produced.

7. The combination as set forth in claim 6 further including dictionary means responsive to said correlation signal for producing an indication of the position of said star pattern.

8. The combination as set forth in claim 6 wherein said comparator address means comprises a plurality of matrix means, each associated with a particular frequency band of light.

9. The combination as set forth in claim 7 wherein said comparator address means comprises a plurality of matrix means, each associated with a particular frequency band of light.

10. The combination as set forth in claims 6, 7, 8, or 9 wherein said filter is of the non-collinear acousto-optic type.

11. A star catalog navigation system comprising:
   a. a two-dimensional array of light detectors;
   b. a non-collinear tunable acousto-optic light filter having a variable frequency band pass characteristic;
   c. comparator control means for enabling said filter to transmit light within selected frequency bands of the light spectrum to said array of light detectors;
   d. optical means for transmitting the light image of a star pattern within the field of view of said optical means through said filter and focusing said image upon said two-dimensional array of light detectors;
   e. comparator address means including a plurality of matrix means, each associated with a particular frequency band of light, for receiving data indicative of the geometrical shape of said pattern together with the frequency signature of the stars within said star pattern;
   f. comparator star catalog means for storing data indicative of reference star patterns together with the frequency signature of the stars comprising said star patterns;
   g. comparator means for comparing the signals received by said comparator address means with the contents of said star catalog means until a correlation signal is produced; and
   h. dictionary means responsive to said correlation signal for producing an indication of the position of said star pattern.

12. The combination as set forth in claim 11 wherein said two-dimensional array of light detectors comprises a vidicon.

* * * * *